Jan. 30, 1940.　　　　　N. CRESS　　　　　2,188,652

ANIMAL TRAP

Filed June 30, 1938

INVENTOR
Nicholas Cress
by his attys.
Stebbins, Blenko & Parmelee

Patented Jan. 30, 1940

2,188,652

UNITED STATES PATENT OFFICE 2,188,652

ANIMAL TRAP

Nicholas Cress, Ambridge, Pa.

Application June 30, 1938, Serial No. 216,745

5 Claims. (Cl. 43—61)

This invention relates to animal traps and, more particularly, to that type of animal trap which is known as a box trap.

A box trap generally comprises an elongated box having one or more openings and mechanism which will close the openings when the animal enters the box and moves bait placed therein. Box traps are generally designed to trap small animals and, therefore, it is essential that the mechanism which closes the openings in the trap be sufficiently sensitive that a very slight pull on the bait by the animal will be sufficient to actuate the mechanism and thus close the openings, thereby entrapping the animal. I have invented a trap in which there is provided mechanism for closing the openings and entrapping the animal which is extremely sensitive and which may be actuated by an extremely slight pull on the bait.

In the accompanying drawing, I have illustrated a present preferred embodiment of my invention in which.

Figure 1:
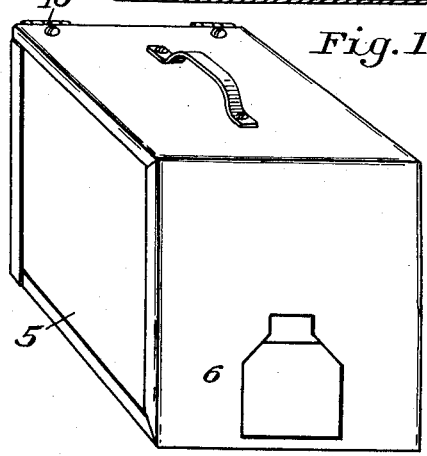
Fig. 1 is a perspective view of my animal trap showing the front end.
Figure 2:
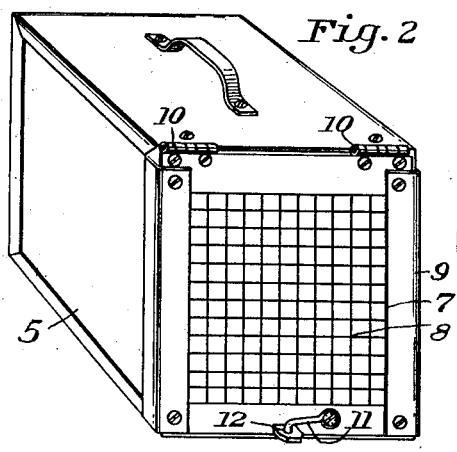
Fig. 2 is a perspective view of my animal trap showing the rear end.

As shown in Figs. 1 and 2, the trap comprises a rectangular box 5 having an opening 6 in one end thereof and having the opposite end 7 hinged so that animals which have been caught may be readily removed. To give the trap a more open appearance so that an animal will more readily enter the trap, the end 7 is made of wire mesh 8. The frame 9 is hinged to the top of the trap by hinges 10 and is held in closed position when the trap is set by the hook 11 and eye 12.

Mounted on that end wall of the box in which the opening 6 is provided is a sliding door 13 which is normally held in an elevated position over the opening by a trip mechanism, hereinafter more fully described. Upon release of the trip mechanism the door 13 will drop by gravity to close the opening 6. Slide-ways for the door are provided by suitably bent metal strips 14 secured against the inner wall of the box and off-set inwardly adjacent each side of the opening to provide channels 15 between the end wall and strips. The edges of the door 6 are received in these channels. A weight 16 is fastened to the bottom of the door 13 to increase the speed with which the door falls down past the opening 6.

Figure 3:
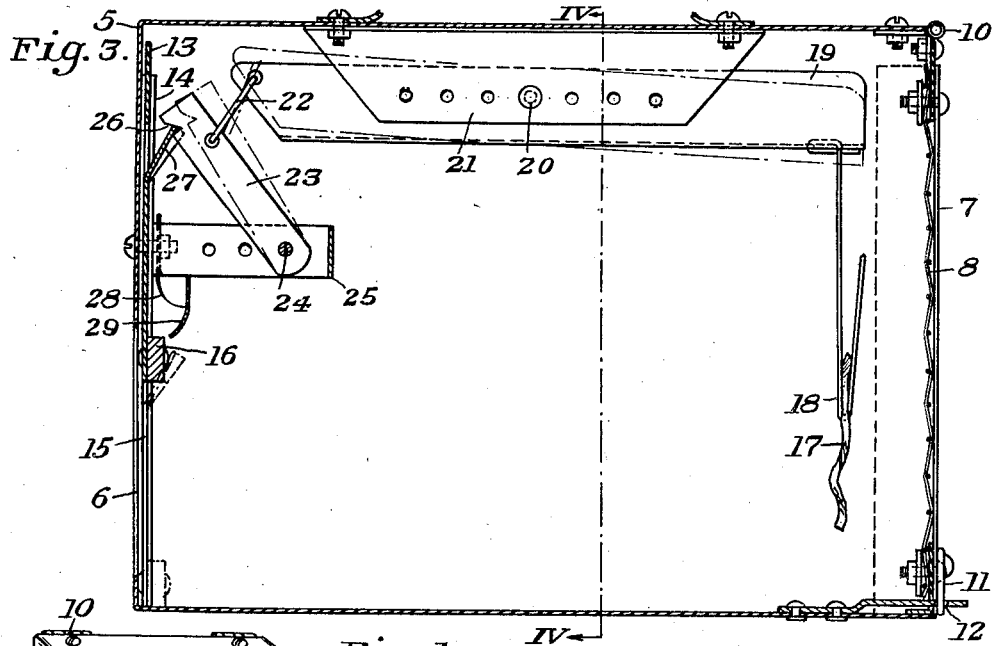
Fig. 3 is a vertical section showing the mechanism for closing the opening.
Figure 4:
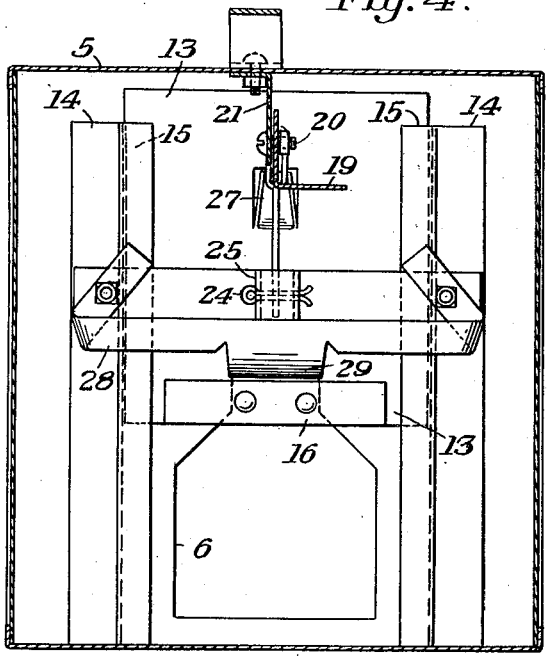
Fig. 4 is a cross section along the lines IV—IV of Fig. 3.

To attract an animal into the trap, bait 17 is placed near the rear end of the trap. The bait is hung on a hook 18 which in turn is suspended from one end of a lever 19. The lever 19 is pivotally mounted on a pin 20 which extends through the lever 19 and through a flange 21 which extends down from the top of the trap. The other end of the lever 19 is connected by a link 22 to a lever 23 rotatably mounted about a pin 24 which extends through the lever 23 and a bracket 25, the bracket 25 being bolted to the inside of the front end of the trap. A notch 26 is cut in the lever 23 and engages a projection 27 which is stamped out from the plane of the door 13. This engagement between the projection 27 and the lever 23 holds the door 13 above the opening 6 as shown in Figures 3 and 4. The position of the door release mechanism and of the door after the animal has pulled on the bait 17 is shown in dot-and-dash lines in Fig. 3. Movement of the bait by an animal in the trap pulls down the end of the lever 19 on which the bait is hung, thereby raising the other end of the lever 19 which is linked to the lever 23. Upward motion of this end of the lever 19 pulls the lever 23 out of contact with the projection 27 and thus allows the door 13 to fall past the opening 6.

The lever 19, the flange 21, and the bracket 25 are provided with a plurality of holes into which the pins 20 and 24 may be inserted, so that the sensitivity of the release mechanism may be adjusted as desired.

To prevent the door 13 from being raised when an animal has sprung the trap, a flexible strip 28 is bolted across the channels 15 above the opening 6. The middle portion of the strip 28 has an inwardly curved projection 29 which has sufficient flexibility to allow the projection 27 on the door to slide past it when the door is released to close the opening 6. If the door is raised, however, the projection 27 on the door will engage the curved projection 29 on the strip 28 and thus prevent the door from being raised. When the trap is being reset, the strip 28 can be pulled back by hand so that the projection 27 on the door will clear the projection 29 on the strip 28.

The trip mechanism above described enables the trap to be easily set by pushing the door 13 upwardly until the lug 27 engages in the notch 26. The door will be released by a very slight movement of the bait. At the same time the door is firmly held against accidental release because the lever 23 is inclined toward the door so that the weight of the door tends to swing the supporting lever downwardly to more firmly hold the door. However, very slight movement of the lever 23 by the lever 19 will release the door.

While I have described a present preferred embodiment of my invention, it is to be distinctly understood that it is not limited thereto, but may be otherwise embodied within the scope of the following claims.

I claim:

1. An animal trap comprising a box having an opening at one end, an automatically operated sliding door for closing said opening and having an interiorly and upwardly extending tongue, means cooperating with said tongue for holding the door above said opening when the trap is set, means actuated by an animal which has entered the trap for withdrawing said door holding means out of cooperation with said tongue thereby allowing the door to fall and close said opening, and means engaging said tongue for holding the door over the opening when the trap has been sprung.

2. An animal trap having an entrance and having a vertically slidable door movable from an elevated position to a lower position where it blocks said entrance, a ratchet-like projection on the door, and means yieldable in a plane normal to the door in the path of travel of said projection, said ratchet-like projection riding past said means on the closing of the door, said means engaging the top of the projection to thereafter keep the door closed.

3. A trap comprising a box having an entrance, a slidable door movable by gravity from an upper position to a position across the entrance, an inwardly extending projection on the door, a trip lever having its lower end pivotally supported in the box below the projection when the door is open, the pivot point being spaced inwardly from the plane of the door, the lever having a notch in the edge nearest the door into which the projection enters, an animal operated lever in the box above the first lever and a link connecting the two levers, the levers being such that motion from the second lever moves the first lever through an arc away from the door.

4. A trap comprising a box having an entrance, a slidable door movable by gravity from an upper position to a position across the entrance, a trip lever pivotally supported in the box and normally retaining the door in said upper position, an animal-operated lever pivotally supported in and near the top of the box and connected to the trip lever at one of its ends and carrying bait at the other end, the levers being so supported that downward movement of the bait carrying end of the second lever causes the first lever to release the door from said upper position.

5. A trap comprising a box having an entrance, a slidable door movable by gravity from an upper position to a position across the entrance, an inwardly extending projection on the door, a trip lever pivotally supported at one end in the box and engaging the projection at its other end to retain the door in said upper position, an animal-operated lever pivotally supported in the box and connected to the trip lever, the levers being so supported in the box that slight movement of the second lever causes the first lever to move in an arc directly away from and out of engagement with said projection and releases the door from said upper position.

NICHOLAS CRESS.